(12) United States Patent
Huang et al.

(10) Patent No.: US 10,480,908 B2
(45) Date of Patent: Nov. 19, 2019

(54) ENERGY ABSORPTION SYSTEM AND DEVICE

(71) Applicant: ST ENGINEERING LAND SYSTEMS LTD, Singapore (SG)

(72) Inventors: Junlin Huang, Singapore (SG); Chen Nam Sim, Singapore (SG)

(73) Assignee: ST ENGINEERING LAND SYSTEMS LTD, Singapore (SG)

( * ) Notice: Subject to any disclaimer, the term of this patent is extended or adjusted under 35 U.S.C. 154(b) by 111 days.

(21) Appl. No.: 15/546,635

(22) PCT Filed: Feb. 4, 2015

(86) PCT No.: PCT/SG2015/050014
§ 371 (c)(1),
(2) Date: Jul. 26, 2017

(87) PCT Pub. No.: WO2016/126200
PCT Pub. Date: Aug. 11, 2016

(65) Prior Publication Data
US 2018/0037141 A1 Feb. 8, 2018

(51) Int. Cl.
*F41H 7/04* (2006.01)
*B60N 2/427* (2006.01)
(Continued)

(52) U.S. Cl.
CPC ......... *F41H 7/046* (2013.01); *B60N 2/01508* (2013.01); *B60N 2/24* (2013.01);
(Continued)

(58) Field of Classification Search
CPC .............. B60N 2/01508; B60N 2/4242; B60N 2/42709; F41H 7/046
(Continued)

(56) References Cited

U.S. PATENT DOCUMENTS

| H1833 H | 2/2000 | Hoppel et al. |
| 6,152,401 A * | 11/2000 | Green .................. B60N 2/24 |
| | | 244/118.6 |

(Continued)

FOREIGN PATENT DOCUMENTS

| CN | 103661028 A | 3/2014 |
| WO | 2010041235 A1 | 4/2010 |

(Continued)

OTHER PUBLICATIONS

PCT/SG2015/050014 International Search Report, Written Opinion and International Preliminary Report on Patentability.

*Primary Examiner* — Jason S Morrow
(74) *Attorney, Agent, or Firm* — Joseph G. Chu; JCIP (57) ABSTRACT

There is disclosed an energy absorption device comprising a plurality of pillars mountable to a ceiling of a hull, each pillar having a fixed portion and a movable portion, the movable portion slidable relative to the fixed portion; a deformable material disposed between the fixed portion and movable portion such that the deformable material resist the sliding movement of the movable portion in one direction; the deformable material further adapted to permanently deform when a blast energy is directed towards the ceiling; and a seat assembly attached to the movable portion, the seat assembly adapted for an occupant.

19 Claims, 9 Drawing Sheets

(51) Int. Cl.
*B60N 2/015* (2006.01)
*B60N 2/24* (2006.01)
*B60N 2/42* (2006.01)
*B60N 2/50* (2006.01)
*B64D 11/06* (2006.01)
*B60R 22/26* (2006.01)
*B60R 22/02* (2006.01)
*B64D 25/04* (2006.01)

(52) U.S. Cl.
CPC .............. *B60N 2/42* (2013.01); *B60N 2/4242* (2013.01); *B60N 2/42709* (2013.01); *B60N 2/50* (2013.01); *B60R 22/26* (2013.01); *B60R 2022/027* (2013.01); *B64D 11/062* (2014.12); *B64D 11/0619* (2014.12); *B64D 11/0649* (2014.12); *B64D 25/04* (2013.01); *F41H 7/042* (2013.01)

(58) Field of Classification Search
USPC ........................................................ 296/68.1
See application file for complete search history.

(56) References Cited

U.S. PATENT DOCUMENTS

| | | | |
|---|---|---|---|
| 7,293,818 B2 | 11/2007 | Kumpf et al. | |
| 8,678,465 B1* | 3/2014 | Aragon | B60N 2/24 244/122 R |
| 8,702,147 B2 | 4/2014 | Cantor et al. | |
| 8,888,161 B1 | 11/2014 | Aragon et al. | |
| 8,888,179 B1* | 11/2014 | Bosen | F16F 7/125 297/216.16 |
| 10,052,984 B1* | 8/2018 | Bosen | B60N 2/4242 |
| 2003/0051598 A1* | 3/2003 | Mauthe | B60N 2/163 89/36.01 |
| 2009/0045659 A1* | 2/2009 | List | B60N 2/42736 297/216.15 |
| 2011/0241373 A1 | 10/2011 | Mehl et al. | |
| 2012/0025570 A1* | 2/2012 | Reinck | B60N 2/24 297/216.1 |
| 2013/0049415 A1 | 2/2013 | Reinck | |
| 2016/0047632 A1* | 2/2016 | Berman | B60N 2/885 296/65.02 |

FOREIGN PATENT DOCUMENTS

WO  2011150501 A1  12/2011
WO  2014027206 A1  2/2014

\* cited by examiner

ENERGY ABSORPTION SYSTEM AND DEVICE

FIELD OF INVENTION

The present invention relates to an energy absorption system and device. In particular, the energy absorption system and device are suitable, but not limited for blast energy absorption such as mine blast energy absorption.

BACKGROUND OF THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

There currently exist a number of devices for absorbing blast energy arising from high impact shock such as mine blasts. These devices are typically in the form of energy attenuation (EA) seats mounted within vehicles or hulls of armoured vehicles so that when a mine blast occurs, these EA seats serve to dissipate blast energy, minimizing injuries and preserving lives of personnel such as soldiers.

Existing EA seats typically comprise dampers such as mechanical springs mounted thereon to mitigate and dissipate blast energy experienced during a blast event. However, while possessing repeatability in terms of its damping properties, mechanical springs are not ideal for absorption of sudden blast energy due to their generation of rebound energy. Drop tests have revealed that, for a reasonably sized spring that does not bottom out on itself, the limits of mechanical spring based shocked attenuation has been attained even when the drop heights are relatively low, that is, the impact generated by the simulated drop height is much lesser that the impact and/or force generated during a mine blast.

An alternative to the use of mechanical spring is the use of deformable solids as energy dampers in EA seats. However, it is not easy to select an ideal deformable solid due to two competing objectives. On one hand, the deformable solid must be soft enough to attenuate shock, but on the other hand it must also be able be rigid enough to endure shock and vibration from daily handling from soldiers and operators such that its damping properties are not compromised as a result of daily operational usage or common usage pattern in military operations, where many a times personnel may jump on and off their EA seats, or when the vehicle carrying the EA seats goes over uneven terrain causing vibrational forces and shock to be transmitted to the EA seats, causing premature deformation of the deformable solids in the EA seats.

Besides blast energy absorption, another consideration in the design of EA seats is compactness and utilization of space that is crucial for an efficient and effective military. There exists in the current market supply foldable EA seats that are mounted either at the bottom of the vehicle hull or at the side. Such an arrangement allows the EA seat's backrest to be foldable, thus enabling users to quickly access and deploy the various payloads behind them once the backrest is folded towards the seat, as is common in military applications.

In comparison with bottom or side-mounted EA seats, blast mitigation is however better achieved when an EA seat is mounted to the ceiling of the vehicle. This is because during a mine blast, the ceiling of the vehicle typically experiences the least shock transmission compared to the rest of the hull and with much lesser local deformation. In this regard, local deformations are individual bumps on the vehicle hull that are caused by shock waves on localized regions. To date, however, no ceiling mounted EA seats could be folded down to permit access to payload behind seats. Existing design that allows the seat backrest to be folded down, such Armatec™ seats, still leaves behind a rigid and obstructing pillar that is bolted to the ceiling. This leads to configuration problems as it meant that payload distributed behind the troopers could not be easily accessed for rapid deployment crucial for military operations. This situation is further exacerbated if the payload items are bulky as in the case of rocket launchers and long-barrelled light arms.

Further, in order for an EA seat to be mounted to the bottom or sides of the vehicle hull, the mounting points might have to accommodate a high local deformation which often causes fasteners such as bolt heads to shear off as the hull bends away from the mounting surfaces. A seat mounted from the ceiling will only have to deal with the globalized acceleration caused by the vehicle being thrown upwards. Therefore, for proper shock attenuation, the EA seat should ideally be mounted on the ceiling.

In addition to the above, another issue with mounting the seat next to the sidewall of the vehicle is the relatively high amount of chordal vibration experienced by the crew. This is especially prevalent for tracked vehicle such as tanks, whereby rhythmic thumping of the tracks hitting the support rollers gets transmitted to the occupants.

Another consideration of an EA seat is weight. The general paradigm is that a true crushable rigid EA seat tends to be relatively heavier compared to a non-EA common/standard canvas seat due to the extensive use of metal frames as its structure. An average crush type EA seat hovers approximately 20 kilograms and upwards.

In view of the above-mentioned considerations and problems, there exists a need to improve existing EA seats to achieve an optimal combination of better EA properties, reduction in weight, and allowance of rapid access to payload at the same time.

The invention seeks to meet the needs at least in part.

SUMMARY OF THE INVENTION

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers In accordance with a first aspect of the invention there comprises an energy absorption device comprising a plurality of pillars mountable to a ceiling of a hull, each pillar having a fixed portion and a movable portion, the movable portion housed within the fixed portion and slidable relative to the fixed portion; a deformable material disposed between the fixed portion and movable portion such that the deformable material resist the sliding movement of the movable portion in one direction when no blast energy is present; the deformable material further adapted to permanently deform when a blast energy is directed towards the ceiling thereby attenuating the blast energy; and a seat assembly attached to the movable portion.

Preferably, the seat assembly comprises a light weight fabric forming a seat for accommodating an occupant.

Preferably, the seat assembly comprises a seat frame and the light weight fabric is in the form of a canvas cover stretchable over the seat frame to form the seat.

Preferably, the deformable material is shaped in the form of a tube.

Preferably, the tube is replaceable after permanent deformation.

Preferably, the movable portion comprises a flange operable to crush and permanently deform the deformable material when a blast energy is present.

Preferably, there comprises an elastic strap for attaching the seat frame to the movable portion.

Preferably, the elastic strap comprises an energy attenuation means.

Preferably, there comprises a side attachment attached to the fixed portions, the side attachment mountable onto a sponson or side of the hull.

Preferably, the side attachment is arch-shaped and arranged to constrain the seat assembly to the sponson in operation.

Preferably, the side attachment comprises deformable material, the deformable material operable to plastically deform under a local blast (shock).

Preferably, the deformable material comprises aluminium alloy.

Preferably, the fixed portion is detachable from the ceiling via a quick-release mechanism.

Preferably, the quick release mechanism requires at least a dual action movement for release.

Preferably, the detachable fixed portion is foldable towards the seat.

In accordance with a second aspect of the invention there comprises a system for blast energy absorption comprising a device having a first energy attenuation means for absorbing blast energy directed towards a longitudinal axis of the device; a second energy attenuation means for absorbing blast energy direct towards a lateral axis of the device; and a third energy attenuation means connected to the first energy attenuation means.

In accordance with a third aspect of the invention there comprises an arrangement in a vehicle comprising an energy absorption device of the first aspect; the energy absorption device capable of moving between a first position suitable for accommodating an occupant and a second position which is compact relative to the first position; a storage area not accessible when the energy absorption device is in the first position; the storage area accessible when the energy absorption device is in the second position.

Preferably, the first position comprises the energy absorption device mounted to the ceiling of the vehicle and the second position comprises the energy absorption device detached from the ceiling in a folded position.

Other aspects and features of the present invention will become apparent to those skilled in the art upon review of the following description of specific embodiments of the invention in conjunction with the accompanying figures.

BRIEF DESCRIPTION OF DRAWINGS

The present invention will now be described, by way of illustrative example only, with reference to the accompanying drawings, of which.

Other arrangements of the invention are possible and, consequently, the accompanying drawings are not to be understood as superseding the generality of the preceding description of the invention.

DETAILED DESCRIPTION OF THE EMBODIMENTS

In the description, it is to be appreciated that reference to the terms 'top', 'bottom', 'up', 'down' are to be construed in the context of normal operation of the device.

In accordance with an embodiment of the invention there is an energy absorption device 10. The energy absorption device 10 is suited, but not limited for the dissipation of blast energy arising from mine blast in military operations.

Energy absorption device 10 comprises a plurality of pillars 20. Each pillar 20 comprises a fixed portion 22 and a movable portion 24. The energy absorption device 10 further comprises a seat assembly 30 adapted for holding an occupant, such as a military personnel, so as to dissipate blast energy away from the occupant in event of a blast.

Each pillar 20 is capable of being mounted to the ceiling of a hull or cabin of a vehicle. As an example, the vehicle is an armored vehicle but it is to be appreciated that the device 10 may be deployed in hulls or cabins of other types of vehicles.

Figure 1A:
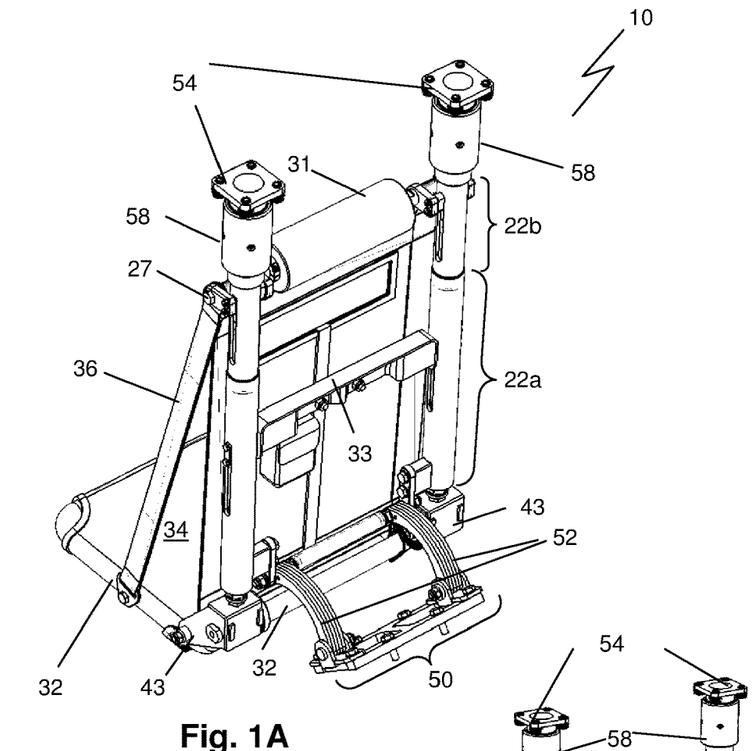
FIG. 1A shows a rear perspective view of an energy absorption device in accordance with an embodiment of the invention.
Figure 1B:
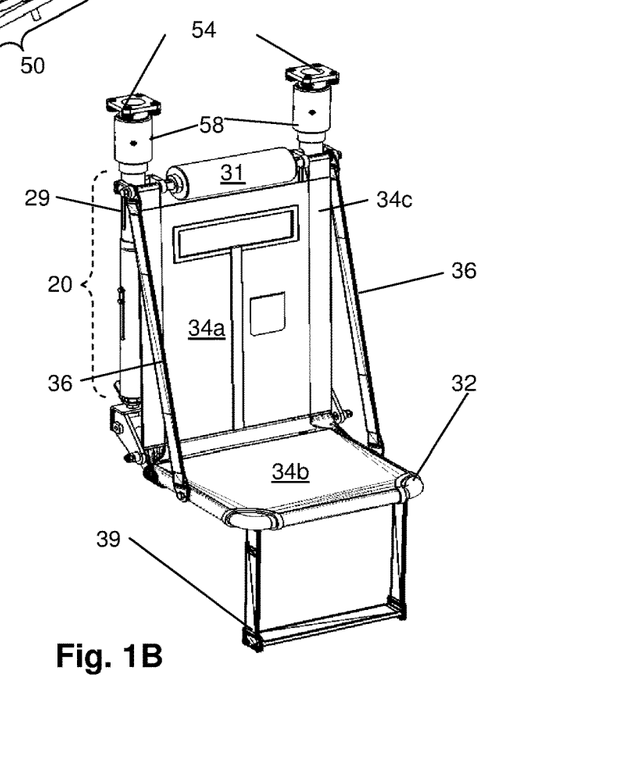
FIG. 1B shows a front perspective view of an energy absorption device in accordance with an embodiment of the invention.
Figure 2A:
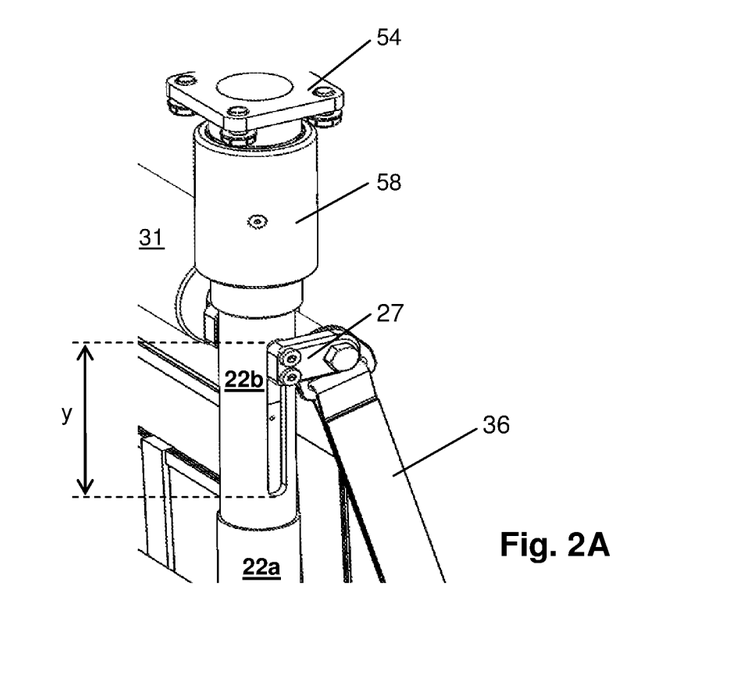
FIG. 2A and FIG. 2B show a zoom-in view of pillars of the energy absorption device.
Figure 2B:
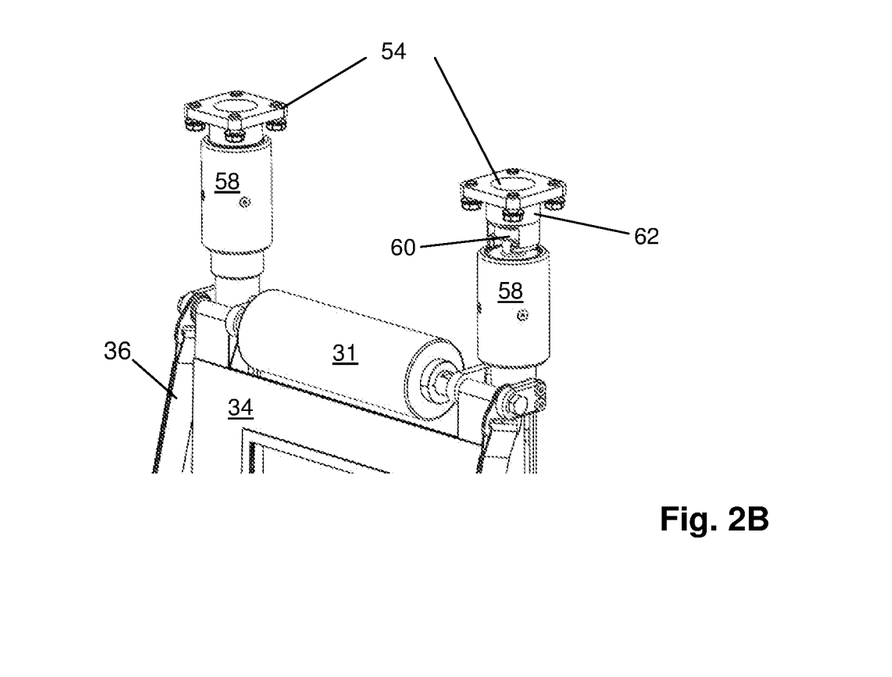
Figure 2C:
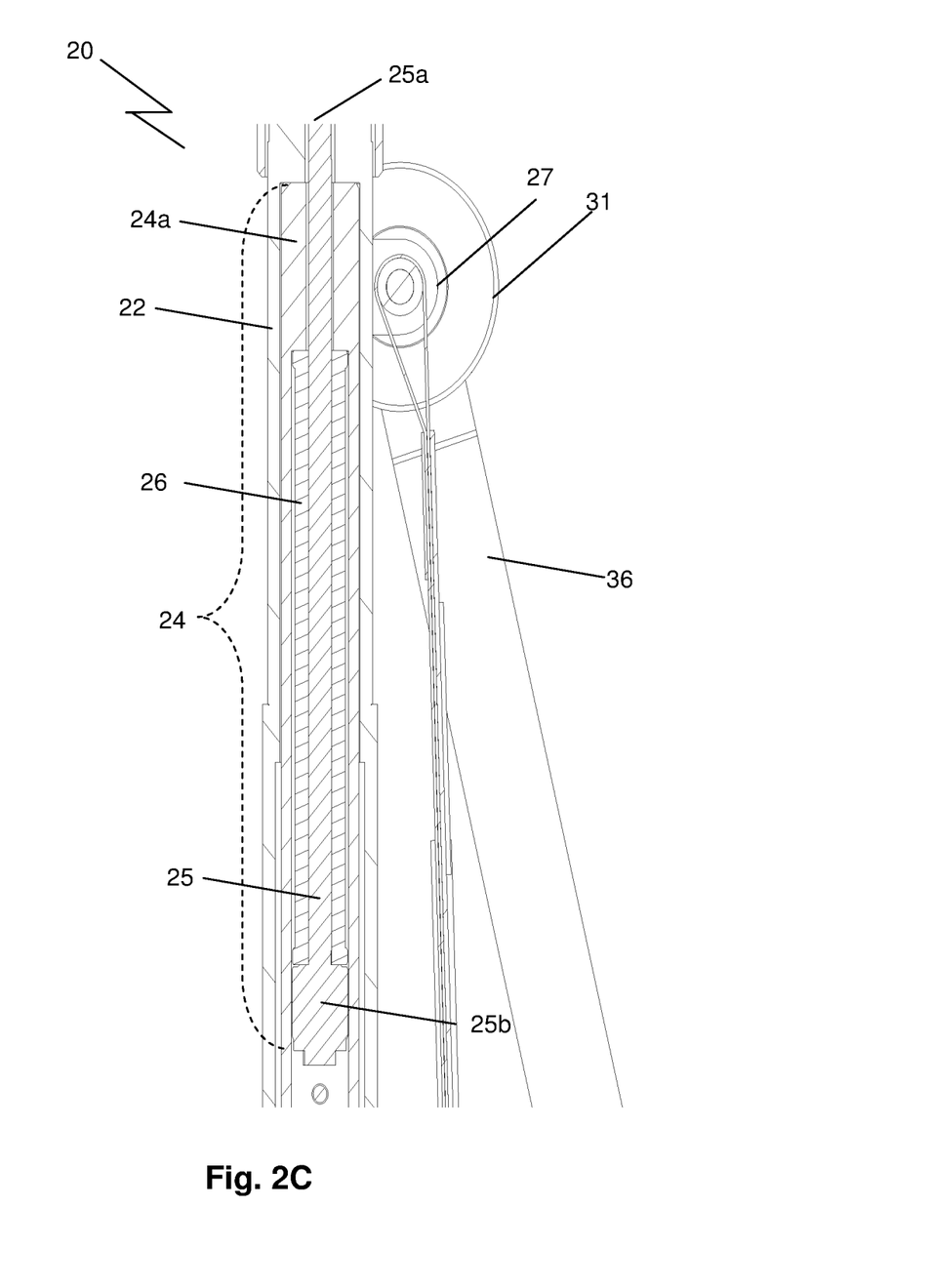
FIG. 2C shows a cross-section of a pillar of FIG. 2A and FIG. 2B having deformable material disposed therein.
Figure 3:
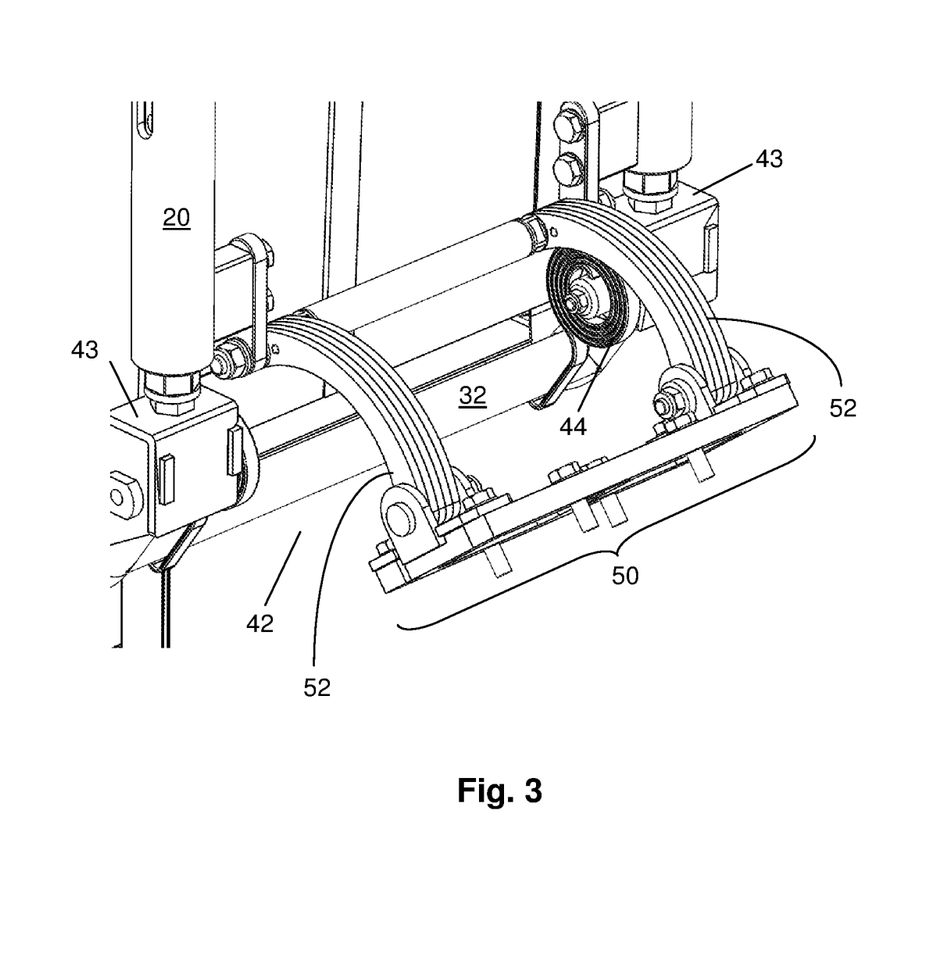
FIG. 3 shows a perspective view of a side attachment in accordance with an embodiment of the invention.

As illustrated in FIG. 1A, FIG. 1B, and FIG. 2C, the movable portion 24 is preferably housed within the fixed portion 22. In a preferred arrangement, the fixed portion 22 is a hollow tubular housing comprising at least one slot 29. The fixed portion 22 further comprises two portions of different diameters 22a and 22b, wherein portion 22b has a smaller diameter relative to portion 22a. The at least one slot 29 is preferably formed on the portion 22b.

Slot 29 is operable to facilitate the following functions:
a. Exposing a part of the movable portion 24 to facilitate attachment of the seat assembly 30 to the movable portion 24; and
b. Constraining the movement of the movable portion 24 to between the two ends of the slot 29, the two ends of the slot 29 defining a distance y. In a preferred embodiment, distance y is about sixty millimeters (60 mm) to one-hundred and fifty millimeters (150 mm). In considering the distance y, it is to be appreciated a balance between two objectives will have to be achieved. In particular, a longer length y will facilitate greater energy attenuation in event of a blast, but the length of y is not to be too long such that an occupant may touch parts of the vehicle in event of a mine blast due to the larger allowable movement of movable portion 24.

As shown in the zoom-in view of FIG. 2A, the movable portion 24 is coupled to an attachment means 27 for attachment to the seat assembly 30. The seat assembly 30, coupled to the movable portion 24, is constrained and movable within the two ends of slot 29. Movement beyond the two ends of the slot 29 is prevented due to the coupling between the attachment means 27 to the movable portion 24.

The portion 22a and the portion 22b with relatively smaller diameter accounts may be separate sections joined together to form fixed portion 22.

Preferably, there may be a plurality of slots 29 positioned along each of the fixed portion 22. Additional slots 29, each having distance y, will aid in constraining the movable portion 24 to its sliding movement within the fixed portion 22, reducing/minimizing any rotational movement of the movable portion 24 relative to the fixed portion 22. In addition, the plurality of slots 29 facilitates additional attachment means 27 to be attached to the seat assembly 30.

Fixed portion 22 further comprises a stopper rod 25 having one end 25a permanently affixed to the fixed portion 22. The other end of the stopper rod 25 comprises a protrusion or flange 25b.

Each movable portion 24 is housed within the fixed portion 22. Referring to FIG. 2C, which shows a cross-sectional side view of the pillar 20, movable portion 24 is preferably a telescopic shaft shaped and dimensioned to receive deformable material 26 and in this regard, preferably comprises an end comprising a flange or protrusion 24a.

When assembled, deformable material 26 is disposed or positioned between the flanges 25b and the 24a and are held in place by the respective flanges 25b and 24a.

In normal operation without exposure to mine blast energy, deformable material 26 is operable to resist the sliding movement of the movable portion 24 in one direction, i.e. movement of flange 24a towards stationary flange 25b. However, upon exposure to a mine blast of sufficiently large impact; the deformable material 26 is further adapted to permanently deform, thereby attenuating blast energy when the blast energy is directed towards the ceiling where the pillar is mounted.

The deformable material 26 may form a tubular structure hereinafter referred to known as a 'crush tube', which when assembled is housed between the telescopic shaft 24 and the stopper rod 25.

In such an arrangement, when an impact of sufficient magnitude, such as a mine blast is encountered, the flange 24a of the movable telescopic shaft 24, in conjunction with the flange 25b of stopper rod 25 which is constrained or affixed to the fixed portion 22, acts as an anvil of a hammer against the crush tube 26 disposed in between the stopper rod 25b and the movable portion 24. In particular, in the event of a mine blast the flange 24a of the telescopic portion 24 accelerates towards the flange 25b and like the anvil of a hammer, the flange 24a crushes the deformable material.

The deformable material 26 may be any material as known to a skilled person for absorbing blast energy, but preferably comprises a metallic material, such as but not limited to an aluminum core or aluminum alloy core having high crush strength to weight ratio. The core is preferably arranged in a honeycomb structure or configuration. Such a structure is strong enough to withstand normal military operations with limited sliding motion.

Between the pillars 20 there comprises a seat assembly 30 for holding an occupant, such as military personnel. It is to be appreciated that the whole seat assembly 30 is attached to the movable portion 24 of the pillars 20 such that the combined weight of the seat assembly 30 with occupant (when present) is on the movable portion 24. The flange 24a of the movable portion 24 in turn presses upon the deformable material/crush tube 26.

The seat assembly 30 comprises a headrest 31 connected to the pillars 20, a seat frame 32, seat belt attachment 33, fabric cover 34, and a seat frame holder 42 for supporting and attaching the seat frame 32 to the pillars 20.

Headrest 31 is horizontally positioned between the two pillars 20 and forms a horizontal support between the two pillars 20. Headrest 31 provides support for an occupant to rest his head when the occupant is seated. Headrest 31 is preferably formed on a support bar 31a attached to the pillars 20 layered/rolled with cushion material wrapped with fabric such as canvas. Headrest 31 may be connected to the pillars 20, in particular the movable portion 24 of the pillar 20 via the attachment 27. Headrest 31 is positioned near the top portion of the pillars 20, i.e. near the portion where pillars 20 are to be attached to a ceiling of a hull of the vehicle.

Figure 4A:
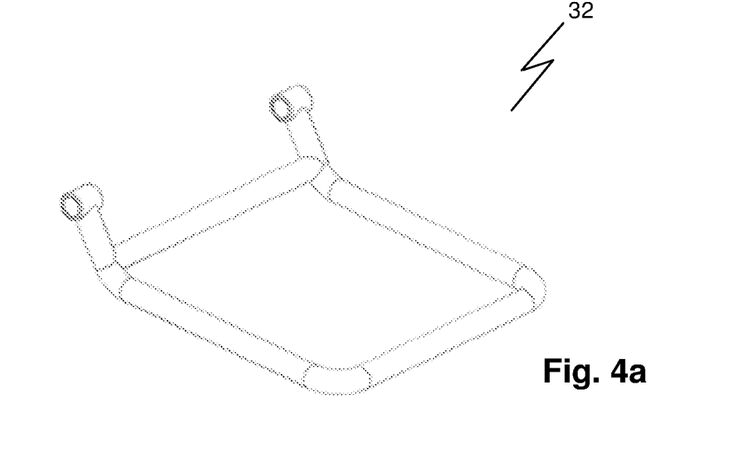
FIG. 4A shows a perspective view of a seat frame and FIG. 4B a fabric cover in accordance with an embodiment of the invention.

With reference to FIG. 4A, seat frame 32 is preferably a square or rectangular frame. The dimensions of two sides of the seat frame 32 are similar to the distance between the two pillars 20. Seat frame 32 is preferably made of light weight metal capable of withstanding the weight of an occupant and withstanding certain level of blast.

Figure 4B:
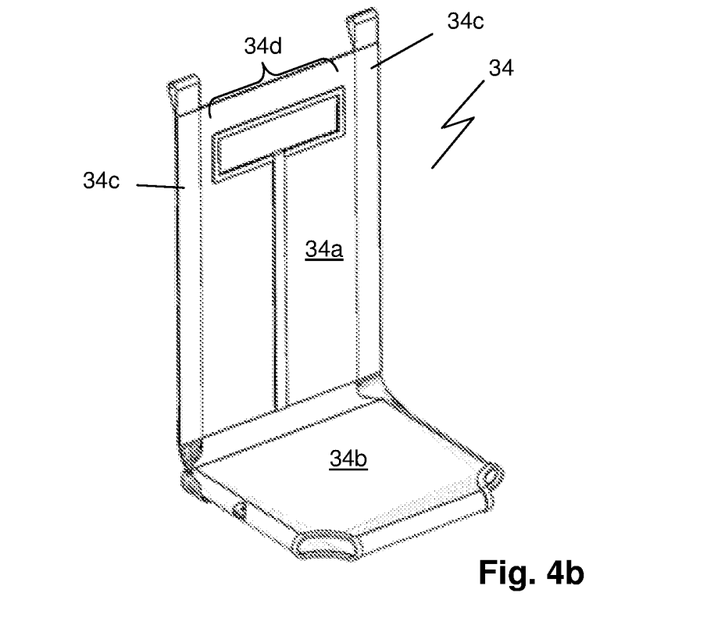

With reference to FIG. 4B, the fabric cover 34 comprises a first sheet 34a forming the back of the seat and a second sheet 34b forming the seat portion where a user's bottom rest on in operation. The first sheet 34a and second sheet 34b are joined at its end via a reinforced load bearing strap 34c which may be sewn on 34a and 34b. The reinforced canvas strip comprises loops 34d for attachment to the headrest 31.

Extending from the bottom portion of pillars 20 is a seat frame holder 42. Seat frame holder 42 comprise two attachments 43 adapted to be attached to two corners of the seat frame 32

Seat frame holder 42 further comprises a pivoting mechanism 44 operable to pivot seat frame 32 towards or away from seat belt attachment 33. Pivoting mechanism may be in the form of two coil springs 44 which provides sufficient torsion to flip or pivot the seat frame 32 towards the seat belt attachment 33, thereby allowing compact storage when not in use. The attachment 43 may be part of or integrated with the two coil springs 44.

Similar to the seat frame holder 42 and headrest 31, seat belt attachment 33 is horizontally positioned between the pillars 20. The seat belt attachment 33 is attached to the movable portion 24 via the slots 29 and ends of the seat belts (not shown) may be affixed to the seat belt attachment 33. An occupant may access the seat belt via a cut-off portion 34d formed in the first sheet 34a. Seat belt attachment 33 may also comprise compartments or pockets for holding various items.

The stretching of the fabric cover 34 (secured to the headrest 31) over the seat belt attachment 33 flanked by the pillars 20 results in an upright back rest for the occupant to rest upon.

Fabric cover 34 is advantageously a lightweight canvas sheet extendable and retrievable from the headrest 31. When extended from the headrest 31, fabric cover 34 lays over the seat frame 32 and seat belt attachment 33 forms a lightweight canvas seat. Seat frame 32 is connected to the movable portion 24 via two elastic straps 36 attached or hinged to the telescopic shaft 24 via a attachment means 27, thereby providing the surface on which the occupant seats on.

Two elastic straps 36 extend from the seat frame 32 to the pillars 20 and are attached to the movable portion 24 via attachment means, which may be belt holder 27. The attachment means are attached to the movable portion 24 via slots 29. Elastic straps 36 aid in supporting the weight of the occupant and maintain the seat frame 32 in a horizontal position under weight.

In addition to weight support, the elastic straps 36 also help to reduce the initial shock caused by a mine blast. Being fabric and stretchable, when a mine blast is present, the elastic straps 36 also aids in energy attenuation as they allow a slower ramp-like force-time plot instead of a binary-like shock effect (see FIG. 6).

A foot-rest 39 may be attached to the seat frame 32. In operation, foot-rest 39 may be utilized by an occupant sitting opposite the device 10. The seat frame 32 is constrained or held in place by the seat frame holder 42.

Advantageously, there comprises a side attachment 50 extending from the seat assembly. The side attachment 50 comprises deformable arches 52 operable to constrain the seat assembly 30 to the sponson of the hull or the sponson of the vehicle. The deformable arches 52 are operable to plastically deform if subjected to a local deformation which may arise from a mine blast (shock), causing deformation of a side wall or sponson of the vehicle. Similar to the deformable material 26, the deformable arches 52 may comprise aluminium or aluminium alloy.

Figure 5:
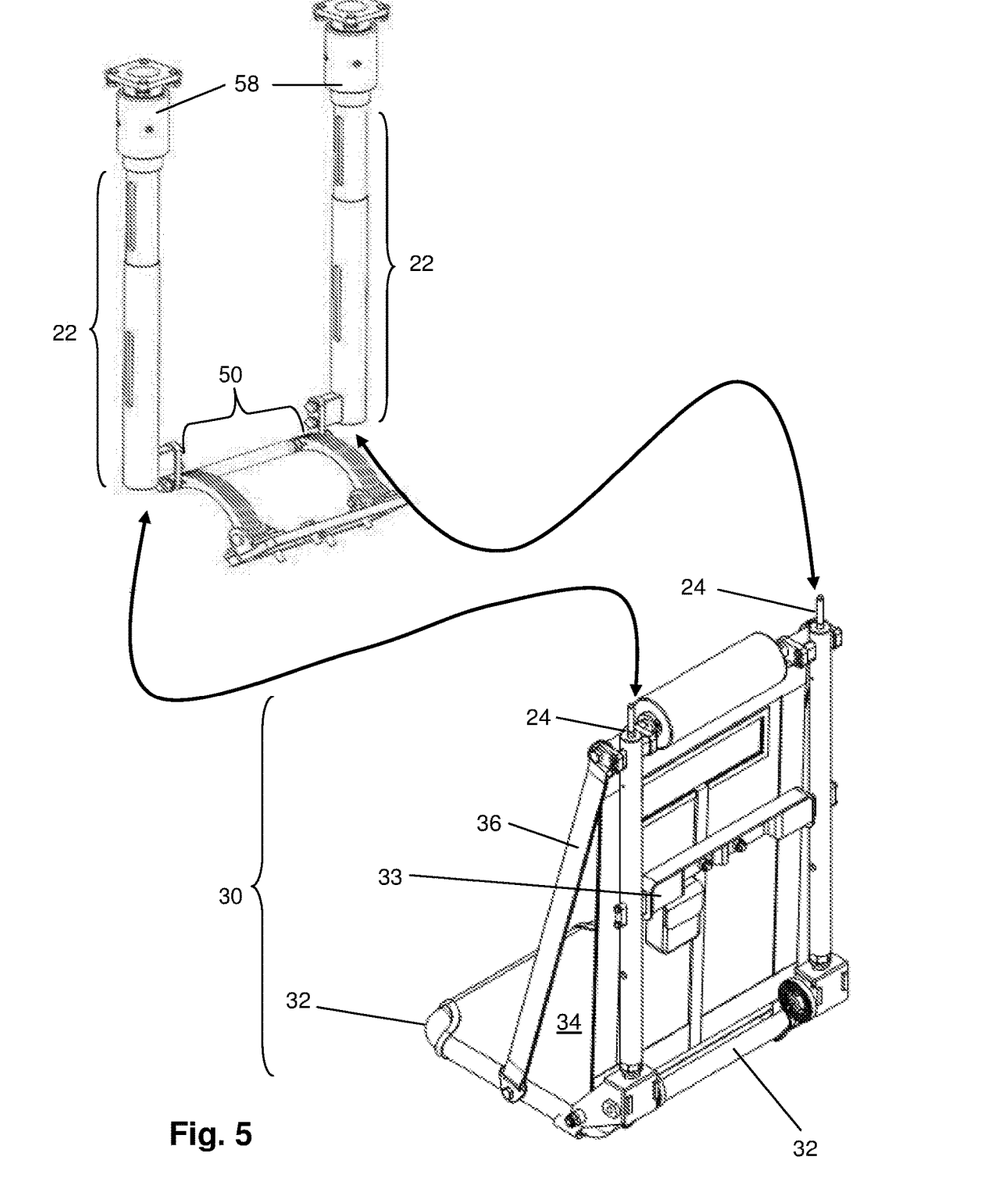
FIG. 5 shows a perspective view illustrating the connection between the seat assembly (with movable portion) and the pillars in accordance with an embodiment of the invention.

FIG. 5 illustrates how the seat assembly 30, together with the movable portion 24 in the form of telescopic pistons, may be attached to the fixed portions 22 of the pillars 20.

For mounting the pillars 20 onto the ceiling of the hull, there comprise mounting plates 54, which may be permanently fastened to the ceiling.

Preferably, there comprises coupling means between the fixed portion 22 and mounting plates 54 to facilitate attachment of the pillar 20 to the ceiling. Coupling means comprises mating portion 60, 62 extending from each pillar 20 and mounting plate 54 respectively. In one embodiment, mating portion 60 may be in the form of a protruding male portion and portion 62 may be a corresponding female portion. There further comprises a carabineer 58 operable to cover the mating portions 60, 62 when the same in a coupled position so as to protect mating portions 60, 62 from any accidental disengagement.

To release the pillars 20 from the ceiling, a user has to deploy both his hands to rotate and turn the carabineer 58 such that the carabineer 58 is slidable downwards to expose the mating portions 60, 62 (See FIG. 6). Once carabineer 58 is rotated and slid downwards, the pillars 20 may be pulled or rotated towards the user, thereby decoupling mating portion 60 from mating portion 62. Such a triple-action based quick release mechanism utilizes a 'rotate, slide and flip' action.

Figure 8:
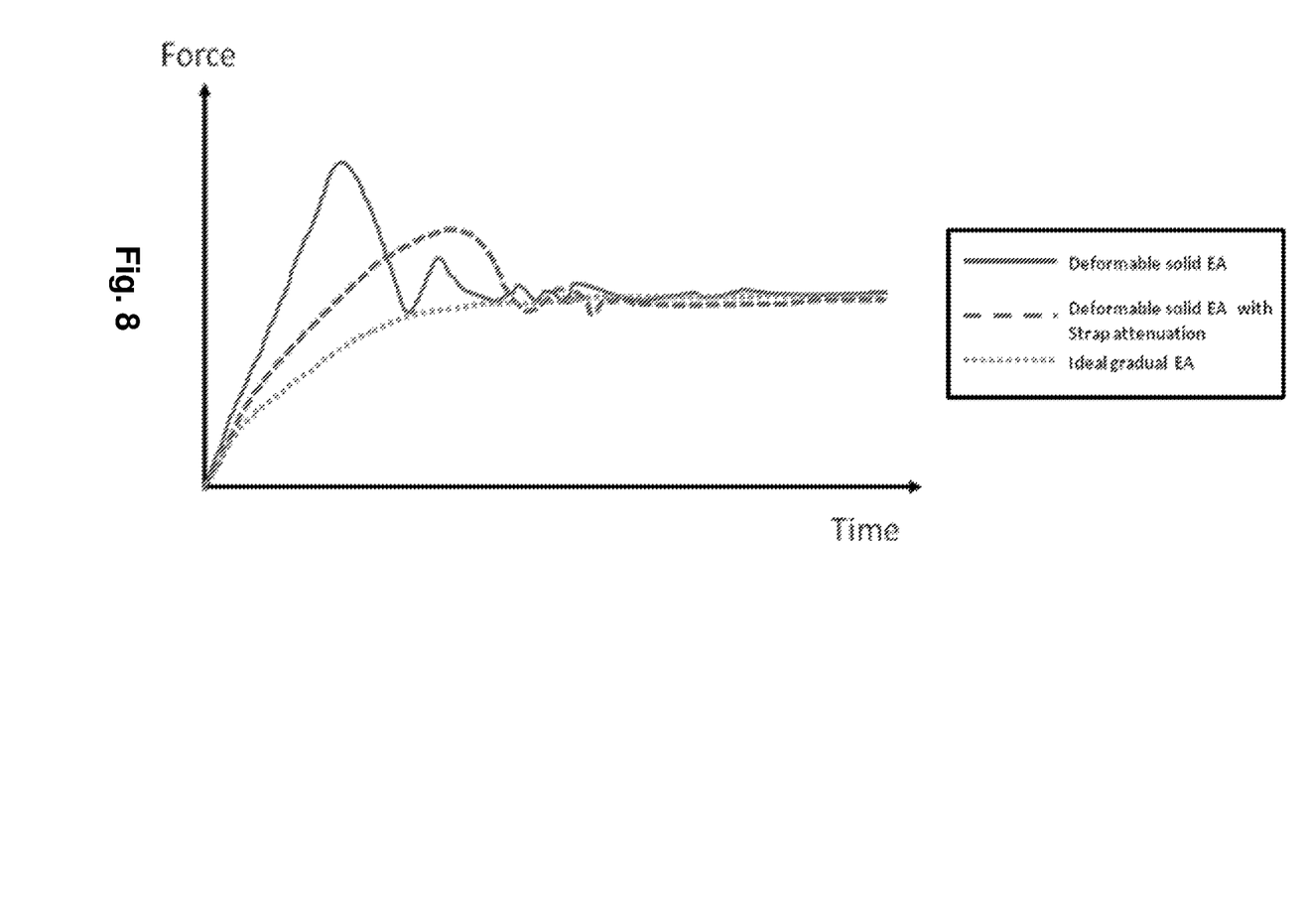
FIG. 8 shows a force vs. time graph illustrating different energy attenuation profiles achieved using deformable solid and combination of deformable solid with a secondary means for energy attenuation, such as elastic straps.

In the development and selection of a suitable deformable solid for blast energy absorption, the inventors have utilized the concept of a thin boundary that segregates the 'crush' phase from the normal 'non-crush' phase. Such a transition resembles a blast or shock-like transition whereby a material catastrophically fails within a short time. Referring to FIG. 8, and assuming that the energy attenuation (EA) exhibit a constant force displacement curve, under the application of a blast approximating a constant stepped force (i.e. from zero blast to full blast), response to such a constant step force in terms of EA under deformation solid alone, and deformation solid with additional secondary attenuation means, such as the elastic strap 36, is illustrated under the force time graph as shown in FIG. 8.

Generally, the harder the EA, the greater the shock transmission to the user, which correlates to higher Dynamic Response Index (DRI). This increases the probability of the user being injured in the blast event. Therefore, the idea is that the EA must be designed to maximize energy attenuation while being able to withstand normal operation usage. In this regard, the inventors have therefore selected the deformable material as described earlier.

The device 10 will next be described in the context of its operation when triggered by an event, such as a blast when the vehicle (where the device 10 is mounted in), contacts an anti-vehicle (tank) mine.

In the event of a blast, the global acceleration of the vehicle hull upwards results in the relative movement of the occupant, and hence the whole seat assembly 30, plunging downwards, with the movable portion, i.e. the telescopic shaft 24 following along, partially led by the elastic straps 36 attachment to the seat frame 32. Meanwhile the fixed portion 22 (and the stopper rod 25) which are directly or indirectly affixed to the ceiling of the vehicle follows the upward movement of the vehicle. As the telescopic shaft 24 moves downwards it will crush the crush tube 26, the flange 24a functioning like an anvil hammering on/against the crush tube 26. This crushing effect absorbs the shock energy from the mine blast. The crush tube 26 is the primary component being plastically deformed in this event and it is to be appreciated that the crush tube 26 could be swapped out for a fresh crush tube for another round of blast event. This above described mechanism completes the shock mitigation for global shock effect.

The pivot arches 52 of the side attachment 50 serve another function of plastically deforming in the event of a local deformation arising from a localized shock or blast effect. Local shock effects cause deflection of the hull in a localized region. The pivot arches 52 are designed to withstand normal usage pattern of pivoting and mobility and yet is flexible enough to bend in the event that the surfaces that it is mounted on flexes due to shock. By allowing the arches 52 to plastically deform after a certain loading, the shock transfer from the local region to the seat assembly 30 is reduced. In total, three different types of components, the elastic straps 36, the pivot arches 52 and the crush tubes 26 provides a multi-tier approach to mitigating a single shock or blast event. It is to be appreciated that additional attenuation means may be added for energy attenuation.

In another embodiment, the energy absorption device 10 may be viewed in the perspective of an energy absorption system having multiple energy attenuation means. In particular, in event of a blast bulk of the blast energy will be absorbed by the deformable solid 26, with the elastic straps 36 contributing to the energy absorbing or attenuation at the onset of the blast (ramp up phase in FIG. 8) and any residual blast energy not absorbed by the deformable solids. In addition, the side attachment 50 will absorb bulk of the blast energy arising from any localized blast (shock) where necessary. It is to be appreciated that the canvas fabric 34, itself being a soft material, may contribute to the secondary or tertiary energy attenuation. Each of the energy attenuation means contribute to the absorption of energy depending on the direction of blast energy.

Figure 6A:
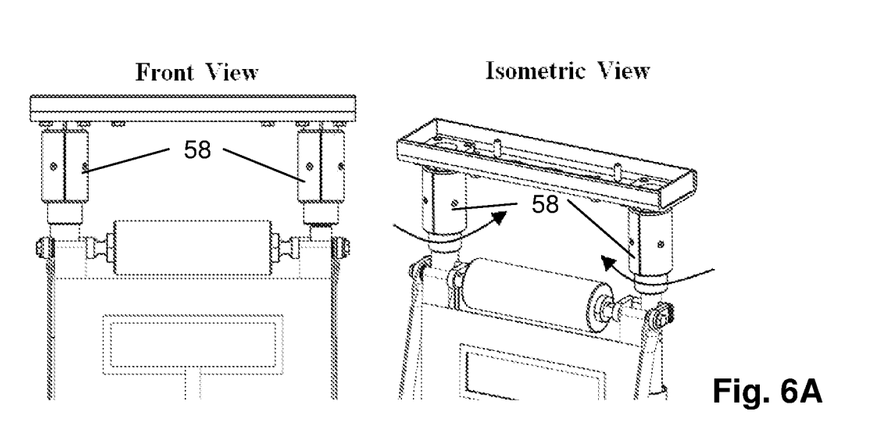
FIG. 6A to FIG. 6C illustrates steps associated with releasing the pillars of the energy absorption device from the ceiling mount for purpose of compact storage or allowing access to payload in accordance with an embodiment of the invention.
Figure 6B:
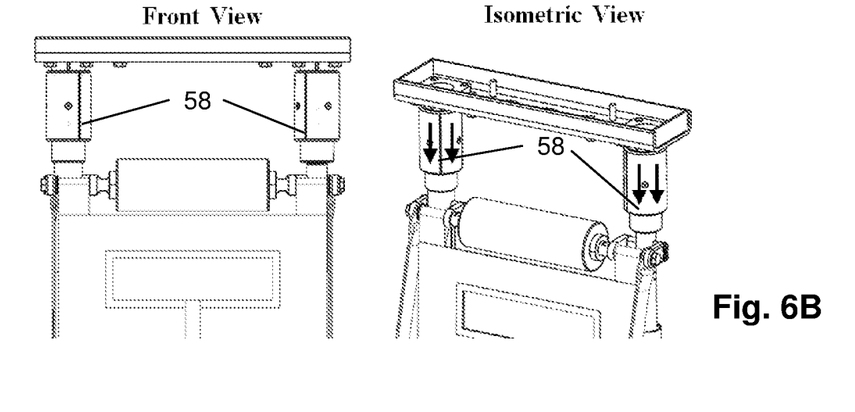
Figure 6C:
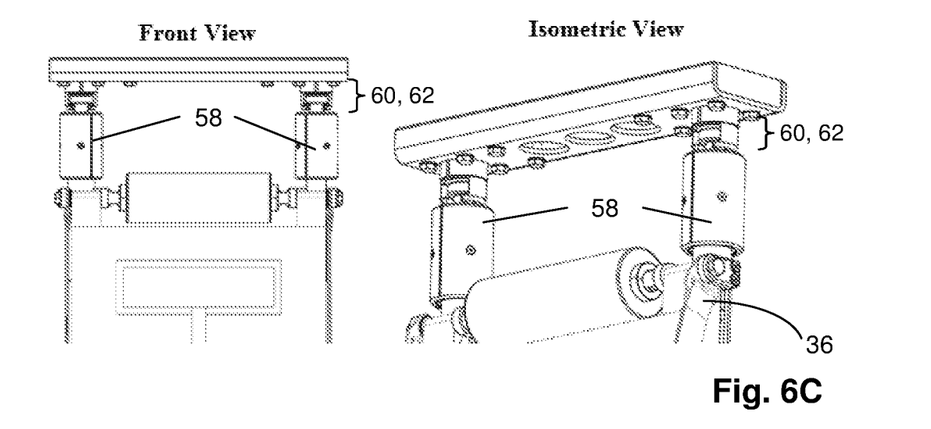

The device 10 will next be described in the context of its folding mechanism to allow quick access to payload. With reference to FIG. 6A to 6C, a detailed explanation of the folding mechanism is illustrated.

Before the seat could be folded down, a part of the quick release mechanism in the form of a carabineer 58 is first rotated away from each other.

The rotation unlocks the carabineer 58 for downward sliding motion.

Sliding the Carabineer down will expose a mating portion 60, which was encased within the carabineer 58. With the mating portion 60 exposed and unconstrained by the carabineer 58, it is then able to pivot out of the corresponding mating portion 62 of the mounting plate 54, which houses it in a fixed position. This 'slide' and 'rotate' is a deliberate dual quick release action which prevents accidental folding down of the seat when an occupant is sitting on it.

Figures 7A, 7B:
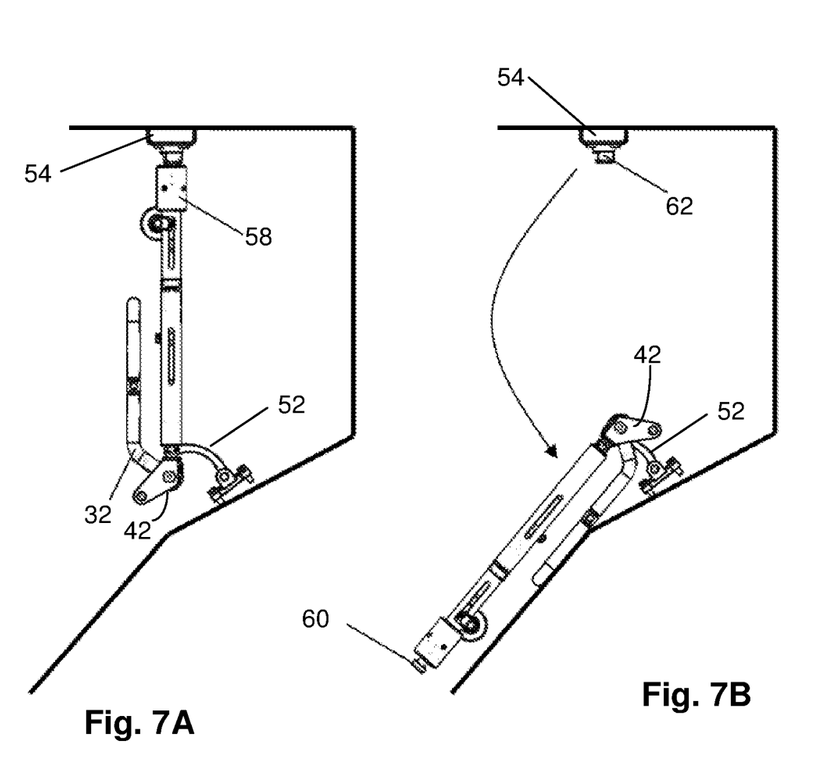
FIGS. 7A and 7B show the side views of the energy absorption device in a upright position and folded-down compact position respectively, illustrating the folding of the energy absorption device for purpose of compact storage or allowing access to payload in accordance with an embodiment of the invention.

The side drawings illustrated in FIG. 7A and FIG. 7B show how the seat frame 32 sprung up in stowed position via torsion spring action of mechanical spring 44 while the fabric cover 34 and elastic straps 36 are blanked out for clarity of illustration. With the carabineer 58 slide down and the fixed portion 22 no longer constrained to the mounting plate 54, the entire seat structure, which is mounted to the hull ceiling, is able to pivot down, thereby allowing its users access to payloads which are behind.

The salient advantages associated with the invention are highlighted as follows:

A. The use of crushable deformable solids enabled more energy to be absorbed in a comparable space compared to that of a mechanical spring. This enables the device 10 to handle a higher shock/blast level arising from higher blast yield. Unlike a mechanical spring, there is no rebound energy. This means it is safer for the occupant.

Compared to just using deformable solid EA (one with a flat force displacement curve) on a hard seat, the use of elastic straps 36 alongside canvas covers allows gentler shock mitigation. The elastic straps, being fabric and thus elastic, is able to give a gentler force-time curve that has a lower peak and a gentler gradient which spread over a longer period of time. This correlates directly a to lower DRI value which is main criterion of judging the effectiveness of blast seats (see FIG. 8).

B. The seat assembly is designed to be quickly de-coupled from the top mount and pivot down. This enables the user to access the payload behind the seat quickly. When folded down, the entire seat assembly structure allows access to payload with minimal obstruction. In a military context, bulky weapons or equipment may be placed directly behind the troopers (occupants), thus affording the vehicle planners great flexibility. This foldable feature does not come at the expense of compromised shock attenuation since the seat is mounted to the ceiling, unlike many of its contemporaries in the market.

C. The fact that the device 10 is mounted to the top and side wall (with side attachment means) means that it takes a lesser beating from vibration effects from vehicle movement. This improves rides comfort and is an important consideration especially for track vehicles.

D. A hybrid canvas and metal structure seat should provide the best of both worlds, while possessing the EA features of a standard hard seat, it should weigh between a canvas and a hard seat. The described embodiment may be achieved with as light as 18 kg without comprising the energy attenuation properties.

E. The plurality of slots 29 disposed at intervals on the fixed portion 22 minimizes rotational movement of the movable portion 24 relative to the fixed portion 22 and provides multiple access points for the seat assembly to be attached to the movable portion 24, allowing a more even distribution of weight of the seat assembly 30.

Although the foregoing invention has been described in some detail by way of illustration and example, and with regard to one or more embodiments, for the purposes of clarity of understanding, it is readily apparent to those of ordinary skill in the art in light of the teachings of this invention that certain changes, variations and modifications may be made thereto without departing from the spirit or scope of the invention as described in the appended claims, such as the following:

- Although the elastic strap 36 has been described as a suitable energy attenuation means in the embodiments, it is to be appreciated that the elastic strap 36 may be enhanced to improve its energy attenuation properties (e.g. addition of deformable solids) although this may add to the overall weight of the device 10.
- The coupling, mounting and quick release mechanism associated with the carabineer 58 and mating portions 60, 62 may be performed in other ways involving folding up of the device 10 towards the ceiling for accessing the payload.

It would be further appreciated that although the invention covers individual embodiments, it also includes combinations of the embodiments discussed. For example, the features described in one embodiment not being mutually exclusive to a feature described in another embodiment may be combined to form yet further embodiments of the invention.

The invention claimed is:

1. An energy absorption device comprising
   a plurality of pillars mountable to a ceiling of a hull, each pillar having a fixed portion and a movable portion, the movable portion housed within the fixed portion and slidable relative to the fixed portion;
   a deformable material housed within each pillar, the deformable material disposed between the fixed portion and movable portion such that the deformable material resist the sliding movement of the movable portion in one direction when no blast energy is present; the deformable material further adapted to permanently deform when a blast energy directed towards the ceiling is present; and
   a seat assembly attached to the movable portion of each pillar.

2. The energy absorption device according to claim 1, wherein the seat assembly comprises a light weight fabric forming a seat for accommodating an occupant.

3. The energy absorption device according to claim 2, wherein the seat assembly comprises a seat frame and the light weight fabric is in the form of a canvas cover stretchable over the seat frame to form the seat.

4. The energy absorption device according to claim 1, wherein the deformable material is shaped in the form of a tube, the tube is replaceable after permanent deformation.

5. The energy absorption device according to claim 1 wherein the movable portion comprises a flange operable to crush and permanently deform the deformable material when a blast energy is present.

6. The energy absorption device according to claim 3, wherein there comprises an elastic strap for attaching the seat frame to the movable portion.

7. The energy absorption device according to claim 5 wherein the elastic strap comprises an energy attenuation means.

8. The energy absorption device according to claim 1, wherein there comprises a side attachment attached to the fixed portions, the side attachment mountable onto a sponson.

9. The energy absorption device according to claim 8 wherein the side attachment is arch-shaped and arranged to constrain the seat assembly to the sponson in operation.

10. The energy absorption device according to claim 9, wherein the side attachment comprises deformable material, the deformable material operable to plastically deform under a local blast (shock).

11. The energy absorption device according to claim 10, wherein the deformable material comprises aluminium alloy.

12. The energy absorption device according to claim 1, wherein the fixed portion is detachable from the ceiling via a quick-release mechanism.

13. The energy absorption device according to claim 12 wherein the quick release mechanism requires at least a dual action movement for release.

14. The energy absorption device according to claim 12, wherein the detachable fixed portion is foldable towards the seat and vice-versa via a pivoting mechanism.

15. The energy absorption device according to claim 8, wherein the fixed portion is detachable from the ceiling via a quick-release mechanism and wherein the energy absorption device is pivotable about the side attachment.

16. The energy absorption device according to claim 1, wherein the fixed portion is a hollow tubular housing, the fixed portion further comprises at least one slot exposing a part of the movable portion housed within the fixed portion.

17. The energy absorption device according to claim 16, wherein the slidable movement of the movable portion within the fixed portion is constrained by a length of the slot.

18. An arrangement in a vehicle comprising
an energy absorption device of claim 1; the energy absorption device capable of moving between a first position suitable for accommodating an occupant and a second position which is compact relative to the first position;
a storage area not accessible when the energy absorption device is in the first position; the storage area accessible when the energy absorption device is in the second position.

19. An arrangement according to claim 18, wherein the first position comprises the energy absorption device mounted to the ceiling of the vehicle and the second position comprises the energy absorption device detached from the ceiling in a folded position.

* * * * *